United States Patent
Sugimoto

(10) Patent No.: US 10,613,361 B2
(45) Date of Patent: Apr. 7, 2020

(54) DISPLAY DEVICE

(71) Applicant: SAKAI DISPLAY PRODUCTS CORPORATION, Sakai-shi, Osaka (JP)

(72) Inventor: Arimasa Sugimoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/755,953

(22) PCT Filed: Aug. 31, 2015

(86) PCT No.: PCT/JP2015/074806
§ 371 (c)(1),
(2) Date: Jun. 25, 2018

(87) PCT Pub. No.: WO2017/037857
PCT Pub. Date: Mar. 9, 2017

(65) Prior Publication Data
US 2018/0307085 A1   Oct. 25, 2018

(51) Int. Cl.
*G02F 1/1333* (2006.01)
*G02F 1/1335* (2006.01)
(Continued)

(52) U.S. Cl.
CPC .. *G02F 1/133308* (2013.01); *G02F 1/133606* (2013.01); *G02B 6/0088* (2013.01); *G02F 2001/13332* (2013.01); *G02F 2001/133317* (2013.01); *G02F 2001/133322* (2013.01); *H04N 5/645* (2013.01); *H04N 5/655* (2013.01)

(58) Field of Classification Search
None
See application file for complete search history.

(56) References Cited

U.S. PATENT DOCUMENTS

| 2004/0189889 A1 | 9/2004 | Nitto et al. |
| 2008/0218954 A1* | 9/2008 | Kawano ............ G02F 1/133308 361/679.02 |

(Continued)

FOREIGN PATENT DOCUMENTS

| JP | 2004302117 A | 10/2004 |
| JP | 2008216934 A | 9/2008 |

(Continued)

OTHER PUBLICATIONS

ISR issued in Int'l. App. No. PCT/JP2015/074806 dated Nov. 24, 2015.

*Primary Examiner* — Phu Vu
(74) *Attorney, Agent, or Firm* — Greer Burns & Crain Ltd.

(57) ABSTRACT

A display device exhibits improved device thinness and device-border slimness, and makes it possible to definitively position and affix an optical-sheet holding frame. The display device is equipped with an optical sheet, a holding frame for surrounding and holding the optical sheet, and a storage housing for housing the optical sheet and the holding frame, wherein the holding member is positioned by attaching an attachment member that is stronger than the holding frame to multiple locations on the holding frame, and affixing the attachment member to the storage housing by using affixing holes formed in the attachment member.

10 Claims, 6 Drawing Sheets

(51) Int. Cl.
*F21V 8/00* (2006.01)
*H04N 5/645* (2006.01)
*H04N 5/655* (2006.01)

(56) References Cited

U.S. PATENT DOCUMENTS

2014/0104504 A1  4/2014  Kuwajima
2016/0004007 A1* 1/2016  Chen ................. G02F 1/133308
                                                 349/65
2016/0291240 A1  10/2016 Sugimoto

FOREIGN PATENT DOCUMENTS

JP   2014077927 A   5/2014
WO   2015063852 A1  5/2015

* cited by examiner

DISPLAY DEVICE

This is a National Phase Application filed under 35 U.S.C. § 371, of International Application No. PCT/JP2015/074806, filed Aug. 31, 2015, the contents of which are incorporated by reference.

TECHNICAL FIELD

The present invention relates to a display apparatus including an optical sheet, a holding frame surrounding and thus holding the optical sheet, and a housing accommodating the optical sheet and the holding frame.

BACKGROUND ART

Recently, display apparatuses including a liquid crystal display panel are in a wide use. For such a display apparatus, various modifications have been made to decrease the thickness of the display apparatus and to decrease the width of a frame outside the display screen.

For example, in many cases, a holding member that holds an optical sheet, a light guide plate or the like of the display apparatus is made compact in order to decrease the thickness of the display apparatus or decrease the width of the frame. However, in such a case, the strength of the holding member may be decreased as the size thereof is decreased.

In contrast, Patent Document 1 discloses the following liquid crystal display apparatus. In this liquid crystal display apparatus, a rear cover of the liquid crystal display apparatus is provided between a side wall of a bezel and a frame holding a liquid crystal panel. When a screw couples the side wall of the bezel and the frame to each other, the rear cover is secured by the screw together with the side wall of the bezel and the frame. In this manner, a portion of the side surface of the liquid crystal display apparatus that holds the components is strengthened, and thus the strength and the reliability of the liquid crystal display apparatus are improved.

CITATION LIST

Patent Literature

Patent Document 1: Japanese Laid-Open Patent Publication No. 2004-302117

SUMMARY OF INVENTION

Technical Problem

In the case where the holding member is made compact in order to decrease the thickness of the display apparatus and decrease the width of the frame, the strength of the holding member, which is often formed of a plastic material, is decreased. Therefore, if, like in Patent Document 1, the holding member is, for example, secured by a screw, there is a problem that the holding member may not withstand the force of the screw inserted thereto and may be, for example, cracked or deformed, or may not be secured reliably. However, this problem is not considered for the liquid crystal display apparatus in Patent Document 1.

The present invention made in light of such a situation has an object of providing a display apparatus including an optical sheet, a holding frame surrounding and thus holding the optical sheet, and a housing accommodating the optical sheet and the holding frame, in which the holding frame is positioned and secured reliably while the thickness of the device and the width of the frame are decreased.

Solution to Problem

A display apparatus according to the present invention includes an optical sheet; a holding frame surrounding and holding the optical sheet; a housing accommodating the optical sheet and the holding frame; an attachment member having a strength higher than a strength of the holding frame, the attachment member being attached to the holding frame at each of a plurality of positions; and a securing hole formed in the attachment member to secure the attachment member with the housing.

According to the present invention, the attachment member having a higher strength than a strength of the holding frame is attached to the holding frame at each of a plurality of positions thereof. The securing hole formed in the attachment member is used to secure the attachment member to the housing. Thus, the holding frame is positioned.

In the display apparatus according to the present invention, the attachment member is formed of a metal material.

According to the present invention, the attachment member formed of a metal material is secured to the housing. Thus, the holding frame is secured to the accommodating housing via the attachment member, and thus is positioned.

In the display apparatus according to the present invention, the holding frame includes an engageable protrusion to engage the holding frame with the attachment member; the attachment member has a cutout corresponding to the engageable protrusion; and a predetermined gap is provided in a direction along the holding frame, between the engageable protrusion and the cutout.

According to the present invention, a predetermined gap is provided in a direction along the holding frame, between the engageable protrusion and the cutout. This deals with a situation case where the attachment member and the holding frame are formed of different materials and thus have different coefficients of thermal expansion.

The display apparatus according to the present invention further includes a bezel provided to surround the housing. The bezel has a through-hole corresponding to the securing hole in the attachment member.

According to the present invention, for example, a screw is inserted into the through-hole formed in the bezel and the securing hole in the attachment member to secure the attachment member to the bezel.

Advantageous Effects of Invention

According to the present invention, the holding frame is positioned reliably while the thickness of the display apparatus and the width of the frame are decreased.

DESCRIPTION OF EMBODIMENTS

Figure 1:
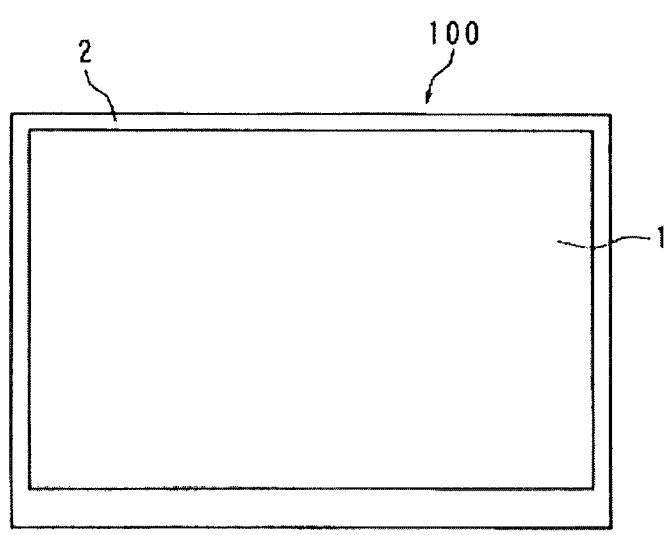
FIG. 1 is a front view showing an external appearance of a liquid crystal TV receiver in embodiment 1.

Hereinafter, a display apparatus in an embodiment according to the present invention will be described in detail with reference to the drawing by way of an example in which the display apparatus is applied to a so-called liquid crystal TV receiver including a liquid crystal panel.

Embodiment 1

FIG. 1 is a front view showing an external appearance of a liquid crystal TV receiver 100 in embodiment 1. In the liquid crystal TV receiver 100, a liquid crystal display panel 1 and other components are accommodated in a bezel 2 and a backlight chassis 6 (housing) described below.

Figure 2:
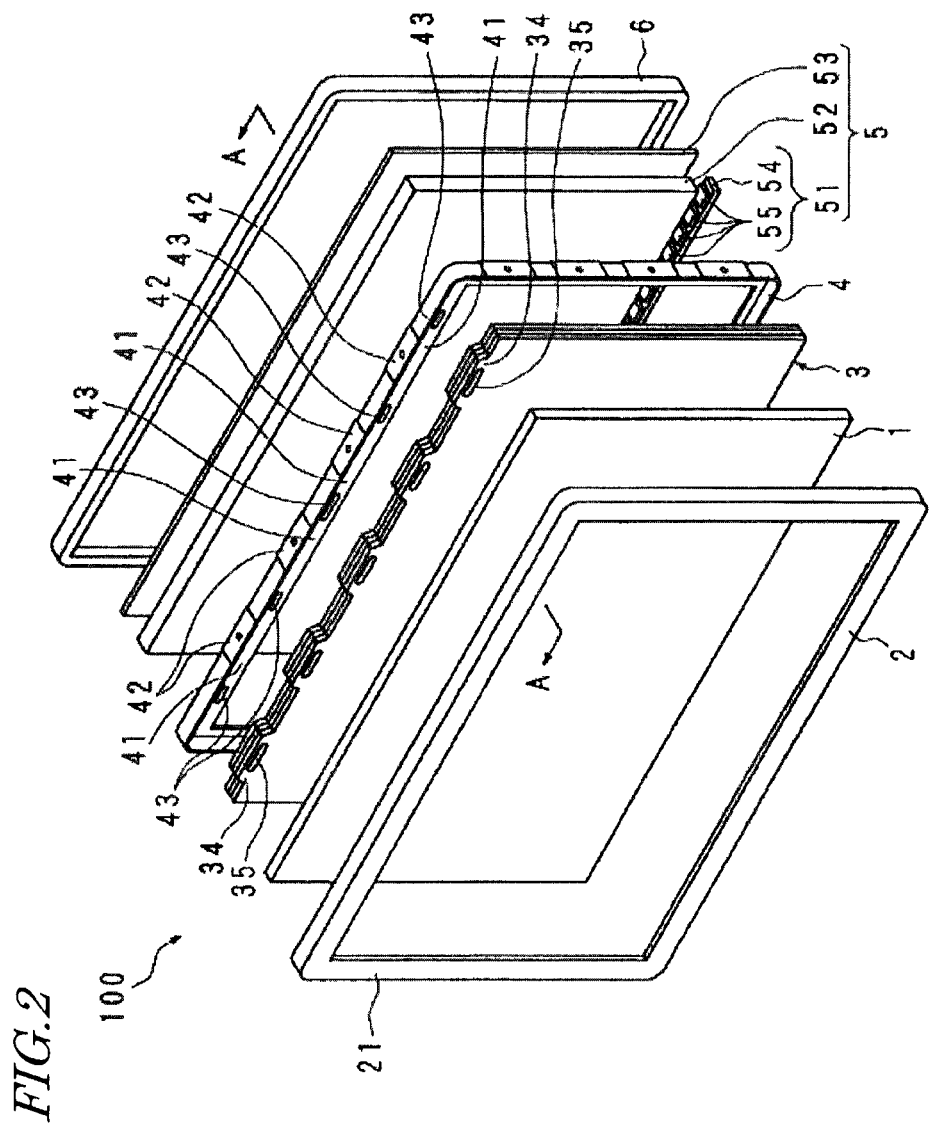
FIG. 2 is an exploded perspective view schematically showing a part of the liquid crystal TV receiver in embodiment 1.
Figure 3:
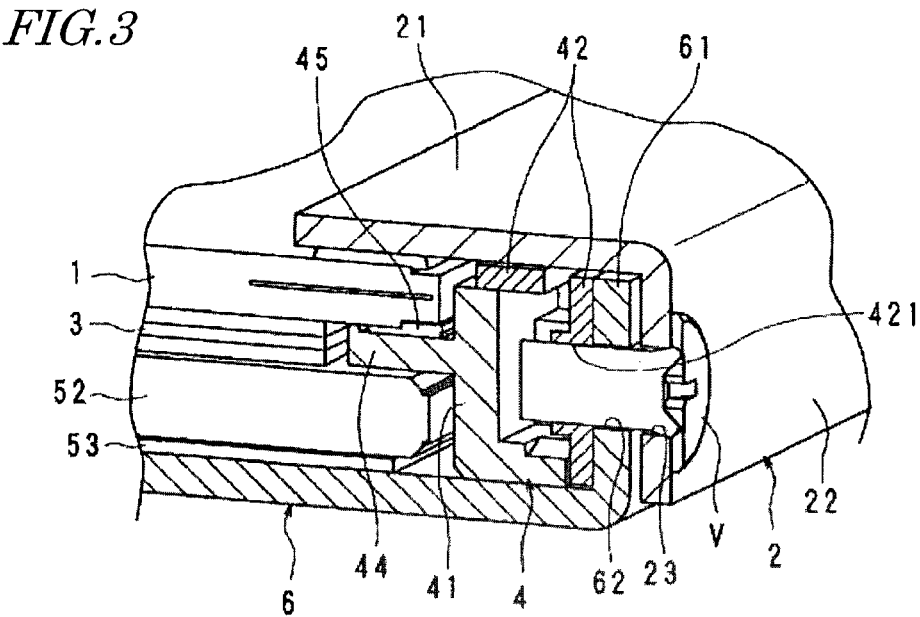
FIG. 3 is a cross-sectional view schematically showing a part of the liquid crystal TV receiver in embodiment 1.

FIG. 2 is an exploded perspective view schematically showing a part of the liquid crystal TV receiver 100 in embodiment 1. FIG. 3 is a cross-sectional view schematically showing a part of the liquid crystal TV receiver 100 in embodiment 1. FIG. 3 is a cross-sectional view taken along line A-A in FIG. 2.

As shown in FIG. 1, the liquid crystal TV receiver 100 in embodiment 1 includes the liquid crystal display panel 1, which is rectangular, at a front surface thereof. The liquid crystal display panel 1 displays images on one surface thereof. An optical sheet 3, a holding frame 4, a light source device 5 and the backlight chassis 6 are provided in this order to the rear of the liquid crystal display panel 1. The light source device 5 includes a light source 51, a light guide plate 52 and a reflective sheet 53.

The optical sheet 3, the holding frame 4 and the light source device 5 are accommodated in the backlight chassis 6 (housing), which has a shape of a cuboid box with one side open. A peripheral edge of the optical sheet 3 and a side wall of the backlight chassis 6 are surrounded by the bezel 2, which is rectangular frame-shaped.

The optical sheet 3 is provided such that one surface thereof faces the other surface of the liquid crystal display panel 1. The light guide plate 52 is provided such that one surface thereof faces the other surface of the optical sheet 3. The reflective sheet 53 is provided such that one surface thereof faces the other surface of the light guide plate 52.

The bezel 2 is a rectangular frame. The bezel 2 includes a rectangular tubular side plate and a loop-shaped frame portion 21 extending inward from one end of the side plate. The bezel 2 has an L-shaped cross section in a thickness direction of the liquid crystal TV receiver 100. The frame portion 21 of the bezel 2 is located to the front of the liquid crystal display panel 1. In other words, a peripheral edge region of the one surface of the liquid crystal display panel 1 is covered with the frame portion 21 of the bezel 2. A user may visually recognize an image displayed on the one surface of the liquid crystal display panel 1 via the frame portion 21.

The liquid crystal display panel 1 is a display panel and has a rectangular flat-plate shape. The liquid crystal display panel 1 adopts an active matrix system. The liquid crystal display panel 1 includes a polarizer (not shown) on the other surface thereof. The liquid crystal display panel 1 is configured to use the polarizer to divide incident light into a P wave (horizontally polarized component) and an S wave (vertically polarized component) such that only the P wave is directed toward the one surface while the S wave is absorbed by the polarizer. The liquid crystal display panel 1 may be, for example, an electrophoretic liquid crystal panel.

The optical sheet 3 provided on the other surface of the liquid crystal display panel 1 is a known component that, for example, diffuses or collects light which is emitted from the light source 51 and enters into the optical sheet 3 via the light guide plate 52, and that directs more uniform light toward the liquid crystal display panel 1. The optical sheet 3 includes, for example, three stacking sheets. In more detail, the optical sheet 3 includes two diffusion sheets and one prism sheet. The prism sheet is sandwiched between the two diffusion sheets. The prism sheet and the diffusion sheets have the same rectangular shape and the same size.

Of the two diffusion sheets, one diffusion sheet provided to face the light guide plate 52 is an optical sheet that diffuses the light which enters into the one diffusion sheet from the light source 51 via the light guide plate 52 and that causes the light to enter into the prism sheet. The prism sheet is an optical sheet that collects the light which enters into the prism sheet via the one diffusion sheet and that directs the light toward the other diffusion sheet. The light transmitted through the prism sheet enters into the other diffusion sheet perpendicularly to the prism sheet.

The other diffusion sheet provided to face the liquid crystal display panel 1 is an optical sheet that further diffuses the light which enters into the other diffusion sheet via the prism sheet such that the light has a more uniform luminance distribution, and that directs the light toward the other surface of the liquid crystal display panel 1.

The optical sheet 3 includes five engageable flanges 34 along one longer side. The engageable flanges 34 are used for engagement with the holding frame 4. The engageable flanges 34 are rectangular, and each have an engageable hole 35 for the engagement with the holding frame 4. For example, the engageable hole 35 is longer in a longitudinal direction of the optical sheet 3.

The holding frame 4 surrounding the edge of the optical sheet 3 and holding the optical sheet 3 is provided to be closer to the other surface (surface facing the light guide plate 52) of the optical sheet 3 in the vicinity of a peripheral edge region of the other surface of the optical sheet 3. As described above, the holding frame 4 is engaged with the optical sheet 3 and thus holds the optical sheet 3 such that the optical sheet 3 faces the liquid crystal display panel 1.

A side wall 61 of the backlight chassis 6 is arranged to locate outside an outer peripheral edge of the holding frame 4. An opening of the holding frame 4 is smaller than the one surface of the light guide plate 52.

On one surface of the holding frame 4 facing the other surface of the optical sheet 3, engageable protrusions 43 are provided along an inner edge. Along the edge of the holding frame 4, for example, five such engageable protrusions 43 protrude in a thickness direction of the optical sheet 3. These engageable protrusions 43 are provided corresponding to the engageable holes 35 of the engageable flanges 34. Thus, the optical sheet 3 is held by the holding frame 4 by the engagement of the engageable protrusions 43 and the engageable holes 35.

A holding plate 44 protruding in a direction along the optical sheet 3 and holding the liquid crystal display panel 1 is provided on the holding frame 4 along a longitudinal direction thereof. A cushion 45, on which the liquid crystal display panel 1 is to be placed, is provided on a surface, of the holding plate 44, that faces the liquid crystal display panel 1.

The other surface of the peripheral edge region of the liquid crystal display panel 1 is placed on the cushion 45, and the one surface of the peripheral edge region of the liquid crystal display panel 1 is pressed by the frame portion 21 of the bezel 2 via a cushion. Thus, the liquid crystal display panel 1 is held.

In the meantime, the holding frame 4 is secured to an inner surface of the side wall 61 of the backlight chassis 6. A side wall 22, which is a part of the bezel 2 other than the frame portion 21, is provided to surround the side wall 61 of the backlight chassis 6. Namely, the side wall 61 of the backlight chassis 6 and the side wall 22 of the bezel 2 are provided to face each other, and the side wall 61 is secured to the side wall 22.

The holding frame 4, the side wall 61 of the backlight chassis 6 and the side wall 22 of the bezel 2 are secured to each other at a plurality of positions along the side wall 22 of the bezel 2 by use of tightening members V such as screws, rivets or the like.

More specifically, the holding frame 4 has securing holes 421 described below, and the side wall 61 of the backlight chassis 6 has through-holes 62 running through the side wall 61 in a thickness direction thereof. The through-holes 62 are formed at positions matching the securing holes 421. The side wall 22 of the bezel 2 has through-holes 23 running through the side wall 22 in a thickness direction thereof. The through-holes 23 are formed at positions matching the securing holes 421 and the through-holes 62. Thus, the holding frame 4 is secured by the tightening members V inserted through the securing holes 421, the through-holes 62 and the through-holes 23, and thus is positioned (secured) reliably.

The light guide plate 52, which is rectangular, is arranged to face the other surface of the optical sheet 3. Namely, the one surface of the light guide plate 52 is configured to face the other surface of the optical sheet 3. The light guide plate 52 diffuses the light emitted from the light source 51 and incident on one side surface thereof, and the light guide plate 52 directs the light from the one surface thereof toward the optical sheet 3.

The light guide plate 52 is formed of, for example, a transparent plate-like material (glass, acrylic resin, polycarbonate resin or the like). In the case where the light source includes point light sources such as LEDs or the like, the light guide plate 52 diffuses light from each of the point light sources and directs the light from the one surface as uniform planar light.

The reflective sheet 53 is, for example, rectangular, and is provided such that the one surface thereof faces the other surface of the light guide plate 52. The reflective sheet 53 returns light directed from the other surface of the light guide plate 52 to the light guide plate 52.

The light source 51 is provided to face the one side surface of the light guide plate 52. The light source 51 includes, for example, a plurality of light emitting diodes (LEDs) 55 mounted on a substrate 54.

The holding frame 4 is provided with attachment members 42 to secure the holding frame 4 with the side wall 61 of the backlight chassis 6 and the side wall 22 of the bezel 2. The holding frame 4 includes attachment portions 41, to which the attachment members 42 are to be attached. The attachment members 42 are formed of a material having a higher strength (hardness) than that of the holding frame 4, and are attached to a plurality of portions of the holding frame 4. The holding frame 4 is formed of, for example, a metal material.

Figure 4:
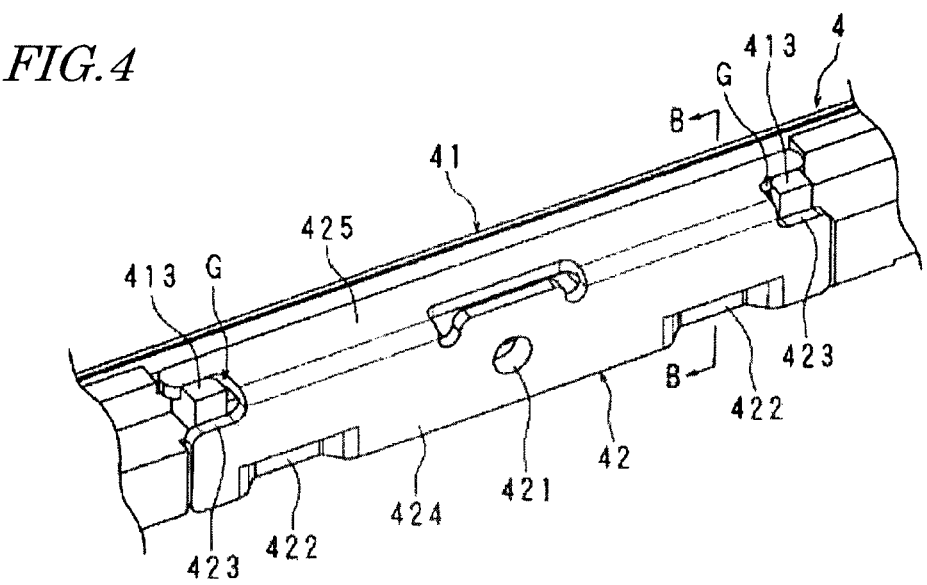
FIG. 4 is an enlarged perspective view of an attachment member of a holding frame and the vicinity thereof in the liquid crystal TV receiver in embodiment 1.
Figure 5:
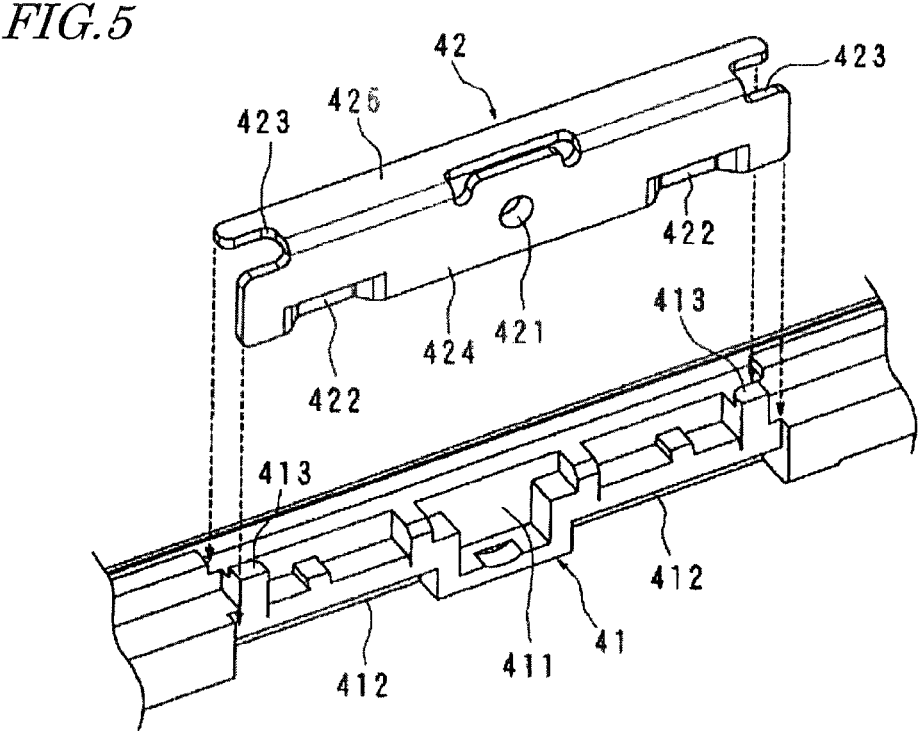
FIG. 5 is a perspective view showing a state where the attachment member is detached from the holding frame in the liquid crystal TV receiver in embodiment 1.
Figure 6:
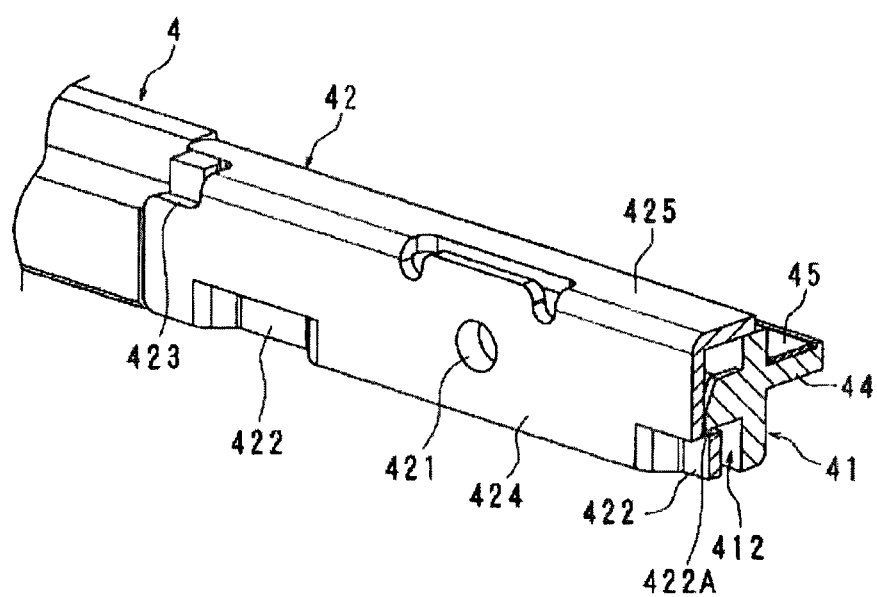
FIG. 6 is a cross-sectional view taken along line B-B in FIG. 4.

FIG. 4 is an enlarged perspective view of one attachment member 42 of the holding frame 4 and the vicinity thereof in the liquid crystal TV receiver 100 in embodiment 1. FIG. 5 is a perspective view showing a state where the attachment member 42 is detached from the holding frame 4. FIG. 6 is a cross-sectional view taken along line B-B in FIG. 4.

As described above, the attachment portions 41, to which the attachment members 42 are to be attached, are formed on the holding frame 4. The attachment portions 41 are formed in a predetermined range along the longitudinal direction of the holding frame 4. The attachment portions 41 each have engageable protrusions 413 at both of two ends thereof for the engagement with the attachment member 42. In the holding frame 4, the engageable protrusions 413 protrude from one surface facing the frame portion 21 of the bezel 2 toward the frame portion 21.

The attachment portions 41 each have holding recessed portions 412 at a surface opposite to the engageable protrusions 413. In a step in which the attachment members 42 are attached to the attachment portions 41, holding bent portions 422, described below, of the attachment members 42 are located in the holding recessed portions 412.

The engageable protrusions 413 and the holding recessed portions 412 are used to fit the attachment members 42 to the attachment portions 41.

The attachment portions 41 each have a tightening member accommodation portion 411 accommodating an end of the tightening member V in a step in which the attachment members 42 are attached to the attachment portions 41. The tightening member accommodation portion 411 is a recessed portion recessed in a direction opposite to the side wall 61 of the backlight chassis 6 and the side wall 22 of the bezel 2.

The attachment members 42 are formed of a metal plate-like material, and each have an L-shaped cross section. The attachment members 42 are strip-shaped members having a longitudinal direction along the holding frame 4. The attachment members 42 each have a side wall-facing plate 424 provided to face the side wall 61 of the backlight chassis 6. A frame edge-facing plate 425 is extended from the side wall-facing plate 424 along one longer side of the side wall-facing plate 424. The frame edge-facing plate 425 makes a right angle with the side wall-facing plate 424, and faces the frame portion 21. Namely, the attachment members 42 are attached to the attachment portions 41 such that the side wall-facing plates 424 face the side wall 61 of the backlight chassis 6 and such that the frame edge-facing plates 425 face the frame portion 21 of the bezel 2. The frame edge-facing plates 425 are strip-shaped members having a shorter-side size that is smaller than that of the side wall-facing plates 424.

The securing hole 421 is formed in each of the side wall-facing plates 424 of the attachment members 42 and is corresponding to the tightening member V. The securing hole 421 is a through-hole running through the side wall-facing plates 424 in a thickness direction thereof. The tightening member V is inserted through the securing hole 421 to secure the attachment member 42 (holding frame 4) to the side wall 61 of the backlight chassis 6 or to the side wall 22 of the bezel 2.

Recently, the holding frame 4 tends to be thinner in order to decrease the thickness of the display apparatus or decrease the width of the frame. In the case where a tightening member V is used as in embodiment 1, a hole needs to be formed in the holding frame 4. The holding frame 4 is often formed of a plastic material and also is thin as described above. Therefore, there is a problem that the holding frame 4 does not withstand the process of forming such a hole and is, for example, cracked or deformed. In such a case, the effect of securing the holding frame 4 is not expected to be provided by the tightening member V.

However, in the liquid crystal TV receiver 100 in embodiment 1, the attachment members 42, which are formed of a metal material and have a higher strength than that of the holding frame 4, are used to secure the holding frame 4. Therefore, even if the holding frame 4 is thin, the attachment members 42 withstand the process of forming a hole, and the problem of causing, for example, cracks or deformation is solved. For this reason, in the liquid crystal TV receiver 100 in embodiment 1, the holding frame 4 is secured to the side wall 61 of the backlight chassis 6 or the side wall 22 of the bezel 2 reliably while the thickness of the device and the width of the frame are decreased.

The attachment members 42 each have an edge portion formed by the side wall-facing plate 424 and the frame edge-facing plate 425, and at both ends of the edge portion, cutouts 423 are formed in the side wall-facing plate 424 or the frame edge-facing plate 425. The cutouts 423 positionally correspond to the engageable protrusions 413 of the attachment portions 41. In a step in which the attachment members 42 are attached to the attachment portions 41, the engageable protrusions 413 and the cutouts 423 are engaged with each other.

The cutouts 423 are formed such that in a state where the engageable protrusions 413 and the cutouts 423 are in engagement with each other, there is a predetermined gap G between the attachment member 42 and each of the engageable protrusions 413 in a longitudinal direction of the side wall-facing plate 424, in other words, the longitudinal direction of the holding frame 4 (see FIG. 4).

In the liquid crystal TV receiver 100 in embodiment 1, there is the gap G between the engageable protrusions 413 and the cutouts 423. This allows for thermal expansion of the holding frame 4.

In the case of being formed of a plastic material, the holding frame 4 is thermally expanded by the heat generated by the light source. However, the attachment members 42 are formed of a material different from the material of the holding frame 4, and the coefficients of thermal expansion of the materials are different from each other. More specifically, the coefficient of thermal expansion of the holding frame 4 formed of a plastic material is several times larger than that of the attachment members 42 formed of a metal material. When the holding frame 4 is thermally expanded, the engageable protrusions 413 and the cutouts 423 are disengaged from each other; and when the holding frame 4 is to be contracted, the contraction of the holding frame 4 is restricted by the engagement of the engageable protrusions 413 and the cutouts 423. As a result, deformation may occur.

However, in the liquid crystal TV receiver 100 in embodiment 1, there is the gap G between the engageable protrusions 413 and the cutouts 423. This allows for the movement of the engageable protrusions 413 caused by the thermal expansion and contraction of the holding frame 4. Therefore, the above-described problem is solved.

The side wall-facing plate 424 has the holding bent portions 422 along the other longer side facing the above-described one longer side. The holding bent portions 422 allow the attachment portion 41 to hold the attachment member 42. The holding bent portions 422 are each formed as follows. Along the other longer side of the side wall-facing plate 424, a cut is made in a thickness direction at a position inner from the other longer side by a predetermined distance, and a portion between the cut and the other longer side is bent toward the attachment portion 41.

Thus, the holding bent portions 422 protrude toward the attachment portion 41, and are accommodated in the holding recessed portions 412. In this state, a side 422A, of each of the holding bent portions 422, closer to the one longer side of the side wall-facing plate 424 contacts the corresponding holding recessed portion 412.

The attachment member 42 holds the attachment portion 41 by use of the holding bent portions 422 and the frame edge-facing plates 425 (see FIG. 6).

Embodiment 2

In the above, a case where the holding frame 4, the backlight chassis 6 and the bezel 2 are secured to each other by use of a tightening member V is described. The present invention is not limited to this.

Figure 7:
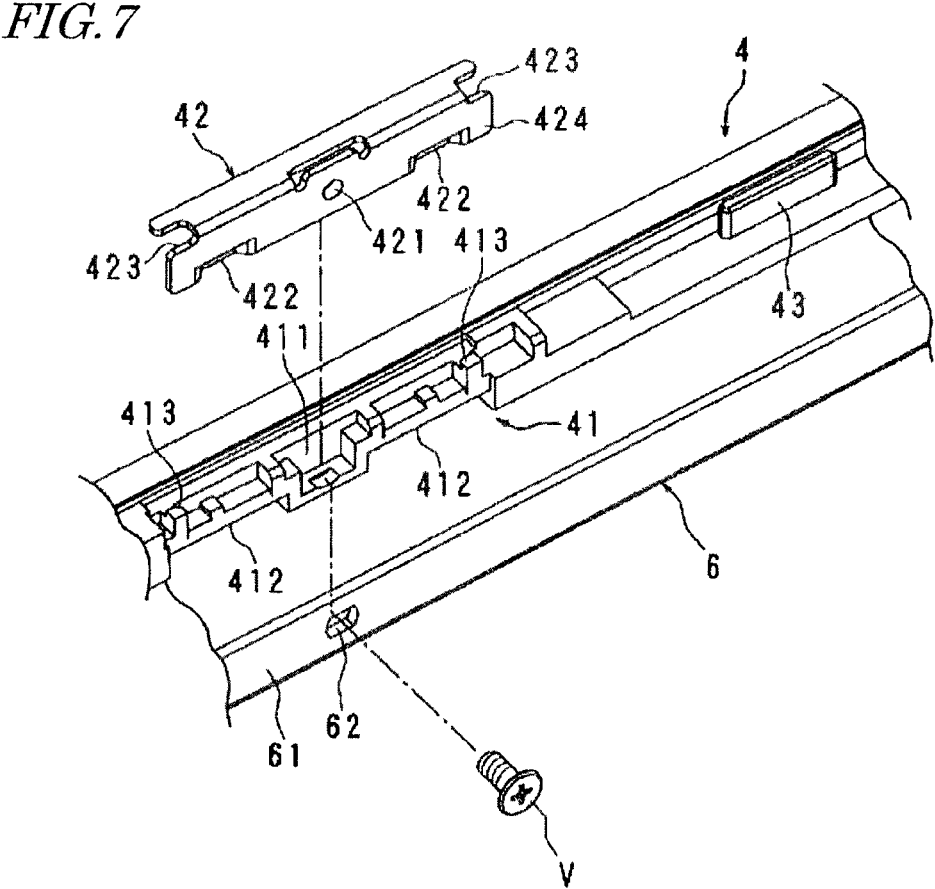
FIG. 7 is a perspective view of a liquid crystal TV receiver in embodiment 2, illustrating how a holding frame and a side wall of a backlight chassis are secured to each other.

FIG. 7 is a perspective view of a liquid crystal TV receiver 100 in embodiment 2, illustrating how the holding frame 4 and the side wall 61 of the backlight chassis 6 are secured to each other.

In embodiment 2, the attachment member 42 is fit into the attachment portion 41 of the holding frame 4. The backlight chassis 6 is provided such that the through-hole 62 in the side wall 61 is positionally matched to the securing hole 421 in the attachment member 42. The tightening member V is inserted into the securing hole 421 and the through-hole 62. Then, the bezel 2 is attached to cover the tightening member V.

The liquid crystal TV receiver 100 in embodiment 2 having such a structure allows the holding frame 4 to be positioned (secured) reliably, and prevents the tightening member V from being seen from the outside of the liquid crystal TV receiver 100 to improve the external appearance.

In the above description, the liquid crystal TV receiver 100 includes a so-called edge-lit backlight unit. The present invention is not limited to this, but is applicable to a device including a so-called direct-lit backlight unit.

REFERENCE SIGNS LIST

1 Liquid crystal display panel
2 Bezel
3 Optical sheet
4 Holding frame
6 Backlight chassis
23 Through-hole
42 Attachment member
52 Light guide plate
100 Liquid crystal TV receiver
413 Engageable protrusion
421 Securing hole
423 Cutout
G Gap

The invention claimed is:
1. A display apparatus, comprising:
an optical sheet;
a holding frame surrounding and holding the optical sheet;
a housing accommodating the optical sheet and the holding frame;

an attachment member having a strength higher than a strength of the holding frame, the attachment member being attached to the holding frame at each of a plurality of positions; and a securing hole formed in the attachment member to secure the attachment member with the housing;

wherein the holding frame includes a second engageable protrusion to engage the holding frame with the attachment member;

the attachment member has a cutout corresponding to the second engageable protrusion; and a predetermined gap is provided in a direction along the holding frame, between the second engageable protrusion and the cutout;

wherein further the cutout is formed in an edge of the attachment member.

2. The display apparatus according to claim 1, wherein the attachment member is formed of a metal material.

3. The display apparatus according to claim 1, further comprising a bezel provided to surround the housing;

wherein the bezel has a through-hole corresponding to the securing hole in the attachment member.

4. The display apparatus according to claim 1, wherein the holding frame has a rectangular shape with four sides and the plurality of positions include two or more positions along a same side of the rectangular shape.

5. The display apparatus according to claim 1, wherein the holding frame has a rectangular shape with four sides and the plurality of positions include two positions along different sides of the rectangular shape.

6. The display apparatus according to claim 1, wherein each attachment member is provided along an edge of the holding frame, the attachment member having a substantially L-shaped cross section in a plane perpendicular to the edge of the holding frame.

7. The display apparatus according to claim 1, wherein the optical sheet has an engageable hole to engage the optical sheet with the holding frame; and the holding frame has a first engageable protrusion corresponding to the engageable hole.

8. The display apparatus according to claim 1, wherein the attachment member includes a first portion substantially parallel to the optical sheet, the first portion is in direct contact with the holding frame, and the optical sheet does not include any portion that is provided between the first portion and the holding frame.

9. The display apparatus according to claim 1, wherein the housing has a through-hole at a position matching the securing hole in the attachment member, and the display apparatus further comprises a tightening member inserted into the securing hole and the through-hole.

10. A display apparatus, comprising:

a display panel;

a light guide plate substantially parallel to the display panel;

an optical sheet between the display panel and the light guide plate;

a holding frame surrounding and holding the optical sheet;

a housing accommodating the optical sheet, the display panel, the light guide plate and the holding frame;

an attachment member having a strength higher than a strength of the holding frame, the attachment member being attached to the holding frame at each of a plurality of positions; and a securing hole formed in the attachment member to secure the attachment member and the housing;

wherein the holding frame includes a holding plate portion to hold the display panel, the holding plate portion being substantially parallel to the optical sheet; and the holding plate portion fits in a space between the display panel and the light guide plate created by the optical sheet.

* * * * *